United States Patent [19]

Mettler et al.

[11] Patent Number: 5,787,935
[45] Date of Patent: Aug. 4, 1998

[54] DEVICE FOR REMOVABLY ATTACHING HEDDLE SUPPORT BARS ON A WEAVING LOOM SHAFT

[75] Inventors: Franz Mettler, Wollerau; Hans Baumann, Horgen, both of Switzerland

[73] Assignee: Grob & Co. AG, Horgen, Switzerland

[21] Appl. No.: 787,915

[22] Filed: Jan. 23, 1997

[30] Foreign Application Priority Data

Feb. 28, 1996 [DE] Germany .................. 196 07 532.7

[51] Int. Cl.⁶ ............................................ D03C 9/06
[52] U.S. Cl. ...................... 139/92; 403/353; 403/381
[58] Field of Search ........................ 139/92, 91, 1 R; 403/381, 353

[56] References Cited

U.S. PATENT DOCUMENTS

| | | |
|---|---|---|
| 2,047,511 | 7/1936 | Kaufmann . |
| 2,144,158 | 1/1939 | Kelly ........................... 139/92 |
| 2,386,690 | 10/1945 | Kaufmann . |
| 2,472,772 | 6/1949 | Kaufmann . |
| 2,511,822 | 6/1950 | Kaufmann . |
| 2,560,512 | 7/1951 | Kaufmann . |
| 2,708,455 | 5/1955 | Kaufmann . |
| 2,769,461 | 11/1956 | Kaufmann . |
| 2,796,083 | 6/1957 | Kaufmann . |
| 2,819,991 | 1/1958 | Harbaugh . |
| 3,154,109 | 10/1964 | Kaufmann . |
| 3,220,441 | 11/1965 | Kaufmann . |
| 3,362,437 | 1/1968 | Kaufmann . |
| 3,412,762 | 11/1968 | Goodman, Jr. et al. ........ 139/92 |
| 4,017,948 | 4/1977 | Vogelbacher ................. 139/92 |
| 4,036,264 | 7/1977 | Kaufmann . |
| 5,275,210 | 1/1994 | Korbutt et al. ............... 139/92 |
| 5,322,088 | 6/1994 | Sampers et al. ............. 139/92 |
| 5,450,880 | 9/1995 | Briner ........................ 139/92 |

FOREIGN PATENT DOCUMENTS

| | | |
|---|---|---|
| 1115648 | 10/1961 | Germany . |
| 1143458 | 2/1963 | Germany . |
| 331474 | 9/1958 | Switzerland . |
| 353313 | 5/1961 | Switzerland . |

*Primary Examiner*—Andy Falik
*Attorney, Agent, or Firm*—Watson Cole Grindle Watson, P.L.L.C.

[57] ABSTRACT

A weaving loom shaft has removable heddle support bars to facilitate their replacement in the loom shaft upon movement of the support bars solely toward one another in the plane of the weaving loom shaft. Slidable telescopic connectors are utilized for removably mounting the heddle support bars in place, such that the heddle support bars can be replaced in the loom shaft upon movement in a direction solely toward the center of the shaft perpendicular to the parallel support rods of the loom shaft.

9 Claims, 3 Drawing Sheets

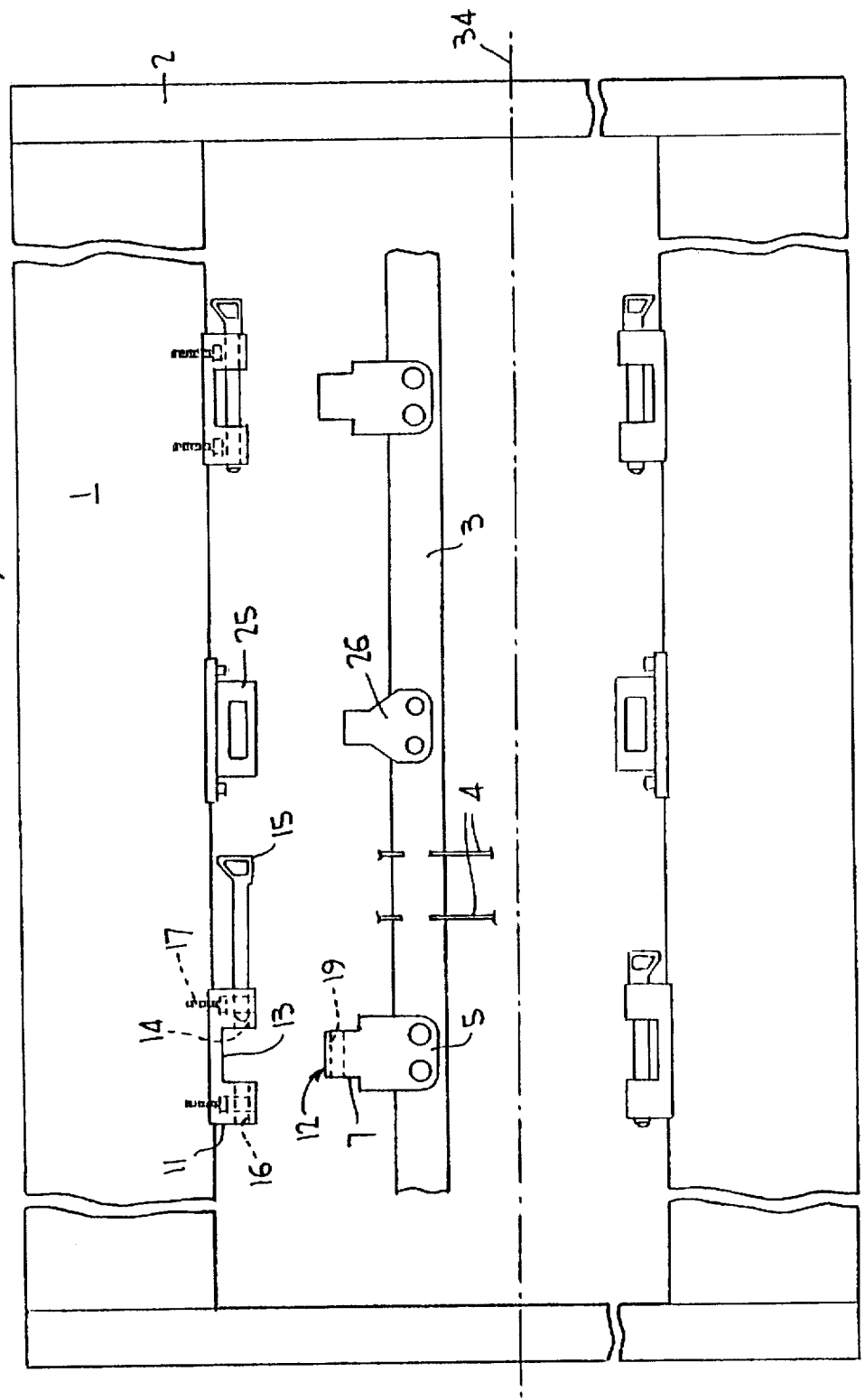

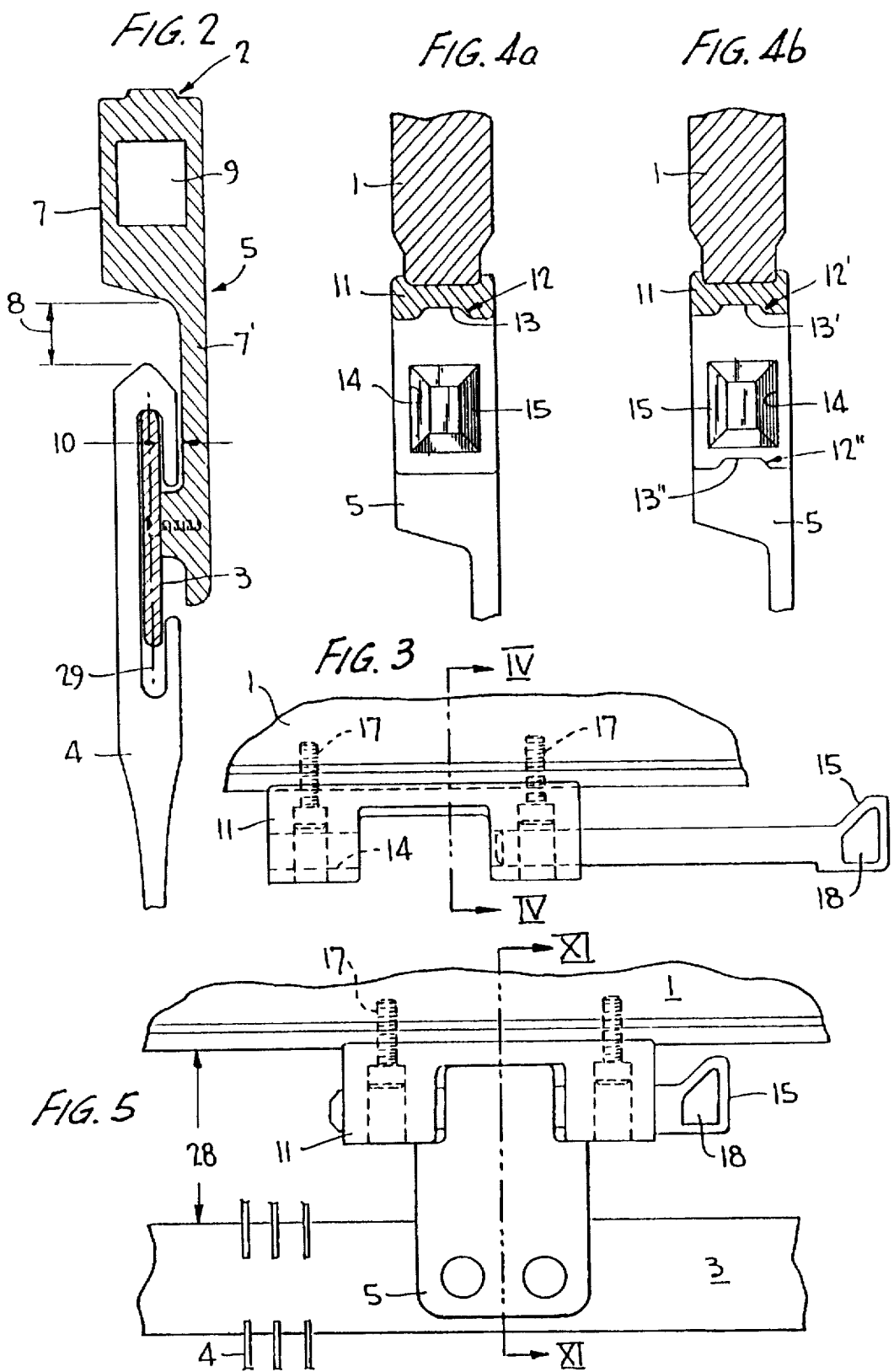

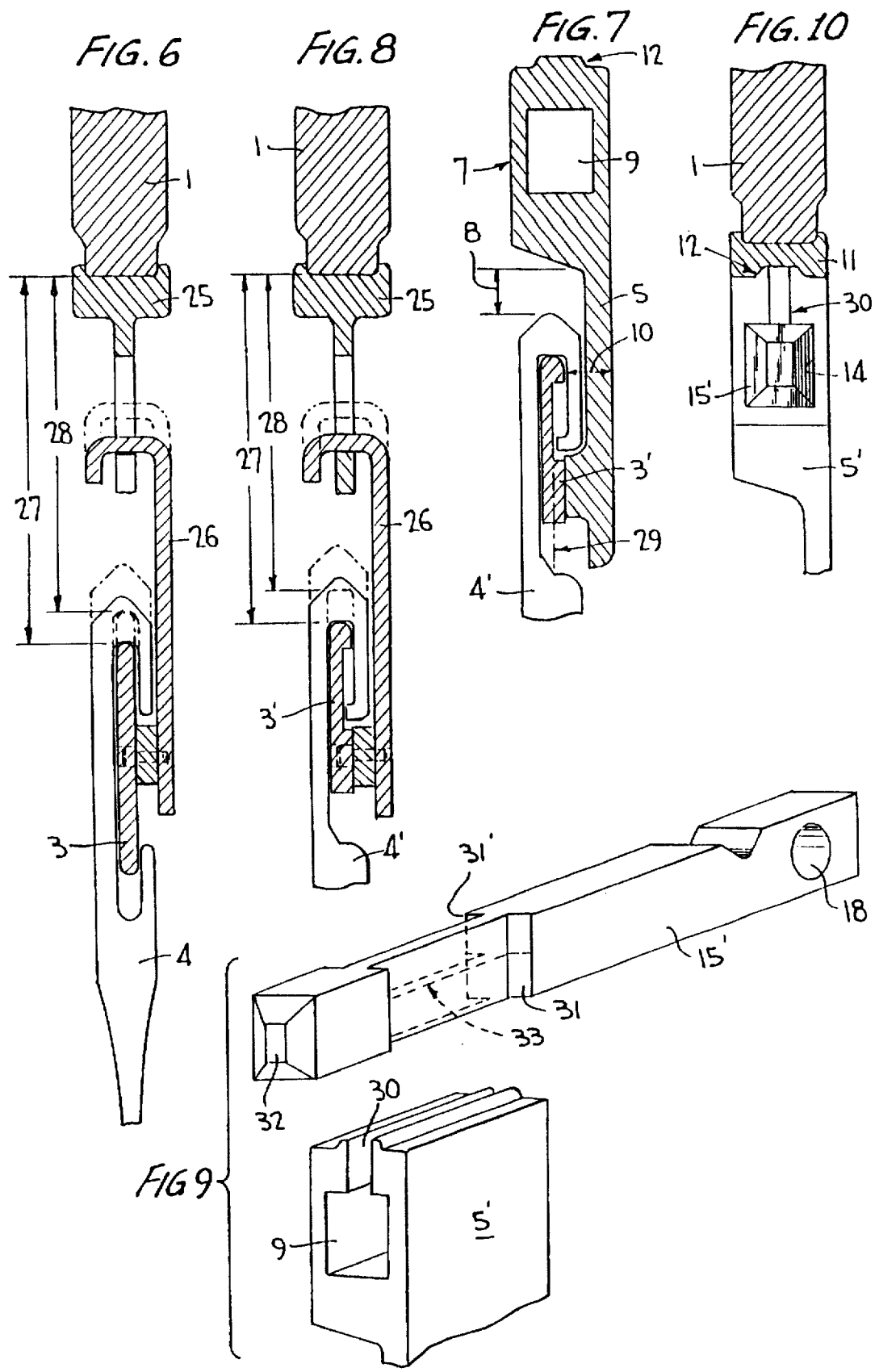

DEVICE FOR REMOVABLY ATTACHING HEDDLE SUPPORT BARS ON A WEAVING LOOM SHAFT

BACKGROUND OF THE INVENTION

This invention relates to a device for removably attaching heddle support bars on a weaving loom shaft which includes support rods and side supports.

The invention originates from experiences gained in weaving mills where so-called weaving loom shafts with slider systems are used. In weaving mills in many areas of the world, the complete weaving loom shafts are not removed from the weaving loom during the warp change or style change replacement, but only the heddle support bars, together with the weaving heddles. To facilitate such procedure, the heddle support bars are attached to the weaving loom shafts with so-called sliders. These sliders clamp at one end about the heddle support bar and at the other end are inserted into holders which are attached to the weaving loom shaft profile. This procedure is quite old and, in a way, has proven itself. However, it has disadvantages which have become more and more apparent, in particular for fast-operating power weaving looms.

Attempts have been repeatedly made to clamp the heddle support bars together with the sliders. However, there are limits to these attempts because the sliders must be displaced laterally to the assembly. With the power weaving loom speeds of present standards, the necessary play relative to the heddle support bars results in rapid wear of the sliders due to vibration. This has a negative effect on the woven textile quality and requires frequent replacement of the sliders. Moreover, it is generally known that it is difficult to produce high quality, first-class textiles, because the sliders have a tendency to produce so-called warp marks. This results from the fact that the equidistant distribution of the heddle on the heddle support bars is disturbed by the presence of the sliders. To avoid this as much as possible, the utmost care must be used when placing the sliders. It is apparent that this will result in considerable down time caused by comparably long and costly resetting times.

The placement of these sliders is arduous manual work, especially if many weaving loom shafts are being used. The reason for not replacing slider systems by so-called sliderless systems is because of the comparatively high costs for sliderless systems, and because very little time is gained during the warp thread replacement if the number of shafts is limited. In many cases, the additional costs for sliderless systems can be more than compensated for with the gain in textile quality. However, because this compensation is not possible in all cases, a great many slider systems are still in use today worldwide, despite the aforedescribed failings.

In U.S. Pat. Nos. 2,047,511, 2,386,690 and 2,511,822, the heddle support bar must be displaced to the side for removing it from the holder at the support shaft for the weaving loom shaft. As long as such operation is not to be carried out in the weaving loom itself, it may appear acceptable. However, in the weaving loom itself, it is difficult to carry out. Since the weaving loom shafts are very close together and must be guided on the side precisely in the guide bars, access to the individual heddle support bars or their fastening on the shaft rod is practically impossible. Furthermore, the fastening of the heddle support bars on the support shafts of the weaving loom shafts no longer tolerate the stresses imposed by today's weaving loom speeds.

The following patents disclose connections that require a displacement to the side of the heddle support bar for removing it from the support rod holder on the weaving loom shaft, or they contain relatively complicated screw and plug-in connections, which prevent a fast removal and re-insertion of the heddle support bars in the weaving loom shaft: Swiss 353 313, German 1 143 458, and the following U.S. Pat. Nos. 2,472,772, 2,560,512, 2,619,991, 2,708,455, 2,769,461, 2,796,083, 3,154,109, 3,220,441, 3,362,437 and 4,036,264.

Swiss 331 474 and German 1 115 648 disclose a manner of removing the heddle support bar from the front. However, for a shaft set that remains in the weaving loom, this removal of the heddle support bar is not possible because of the small intervals between the weaving loom shafts. This operation would be carried outside the weaving loom, which is outside the scope of the present invention.

SUMMARY OF THE INVENTION

The device according to the invention is designed to solve this problem by avoiding the known disadvantages of the slider systems, and to maintain the additional costs for a sliderless system low with short replacement times in the weaving mill and a cost-effective design of the necessary parts. According to the invention the device comprises at least one pair of removably interconnected parts, one of the parts being affixed to a heddle support bar, and the other of the parts being affixed to the weaving loom shaft, both of the parts when interconnected lying in the plane of the weaving loom shaft, and telescopic sliding interconnecting means lying in such plane for removably interconnecting the parts together.

The heddle support bar utilized with the device according to the invention is of known type such as that used with sliderless systems, and supports known heddles. However, it is possible to design a new heddle support bar equipped with support brackets and by using quick acting closures attached to the weaving loom support rod such that they can be removed. As for the slider weaving loom shafts, the actual weaving loom shaft can remain in the weaving loom. The heddle support bars with heddles are affixed at intervals along the length thereof to the support rods of the weaving loom shaft. The cumbersome and time-consuming insertion of the sliders is therefore completely eliminated. As a result, much time is saved during the warp change or style change replacement. And, since no sliders are used and the heddles can glide along the complete length of the heddle support bar, quality reducing warp marks are completely avoided.

The device according to the invention avoids the afore-described disadvantages and permits a simple and time-saving manner of replacing the heddle support bars in weaving loom shafts that remain inside the weaving loom. It is essential for the invention that during the removal of the heddle support bars, together with the heddles, the heddle support bar need not be removed to the side or out of the shaft plane for removal of the bar. Movement of the heddle support bar for removal of the bar from the support rod of the weaving loom shaft takes place in the plane of the weaving loom shaft, toward its center. In such manner, a slight displacement is sufficient, which is essentially no more than the play of the heddles relative to the heddle support bars. This makes it possible to remove the heddle support bars and the heddles from the weaving loom shaft without the disadvantages known from the prior art. The same is true for the insertion of the heddle support bars and heddles into the weaving loom shaft. As a result even in some weaving mills where traditional sliderless weaving loom shafts are used, because of the time required to replace the heddles and heddle support bars is no longer than that for the complete weaving loom shafts. The material costs, however, are much lower because only the heddle support bars with the support brackets according to the invention are needed as replacement materials and not the complete weaving loom shafts.

BRIEF DESCRIPTION OF THE DRAWINGS

FIG. 1 is a side elevational view of a weaving loom shaft with a heddle support bar, including the removable attachment device according to the invention;

FIG. 2 is a cross-sectional view of a bracket of the present device affixed to the heddle support bar, the heddle being shown carried by the support bar;

FIG. 3 is a side elevational view at an enlarged scale, of a holder as part of the device, and a retracted sliding key element;

FIG. 4a is a cross-sectional view of the holder removably attached to a support rod of the weaving loom shaft;

FIG. 4b is a view similar to FIG. 4a of a variant thereof;

FIG. 5 is a view similar to FIG. 3 with the bracket of the device removably attached to the holder;

FIG. 6 is a cross-sectional view of a holding or inset device for temporarily supporting the heddle support bar in the weaving loom shaft;

FIG. 7 is a view similar to FIG. 2 which includes another embodiment of a heddle support bar and a heddle;

FIG. 8 is a view similar to FIG. 6 of another embodiment of a heddle support bar showing another type heddle;

FIG. 9 is an expanded view, in perspective, of another embodiment of support bracket and key element provided for removable attachment; and FIG. 10 is a view, partly in section, of the FIG. 9 bracket attached to the holder.

DETAILED DESCRIPTION OF THE INVENTION

FIG. 1 illustrates a weaving loom shaft 100 which includes support rods 1, side supports 2 and a heddle support bar 3, of a flat steel profile, such as frequently used for sliderless weaving loom shafts. The weaving loom shaft lies in a plane parallel to the paper for reference purposes.

A requisite number of sliderless heddles 4, such as having C-shaped end eyelets, are aligned on the heddle support bar. Support brackets 5 are each affixed to the heddle support bar such that main body portion 7 of the bracket (FIG. 2) is spaced a sufficient distance from the confronting top edge of bar 3 to permit a spacing 8 relative to that of the heddle. And, the depending leg 7' of the bracket is spaced from the confronting side of bar 3 a distance 10 to provide the heddle hook the necessary play. Thus, the heddles can be guided without interference past each support bracket 5 along the complete length of the heddle support bar.

Body portion 7 of the bracket has an opening 9 extending in a direction parallel to bar 3, and has a centering ridge 12. The bracket is inserted into a holding mount or holder 11 for attaching the heddle support bar 3 to support rod 1. It is essential according to the invention that insertion of body portion or end 7 of the bracket into holder 11 takes place essentially in the plane of the weaving loom shaft, from the direction of central axis 34 of the weaving loom shaft.

Holder 11 has a central groove 13 into which centering ridge 12 projects. Thus, the free end 7 of the support bracket and thus also heddle support bar 3 is positioned precisely at support rod 1 of the weaving loom shaft.

A key element 15 slidably engages the bracket and the holder by sliding through aligned openings 14 and 16 of the holder and through aligned opening 9 of the bracket. When completely inserted, the key element projects beyond opening 9 and into guide opening 16. This effects an exact and rigid connection between heddle support bar 3 and support rod 1.

The device according to the invention, as shown in FIG. 1, further includes an inset or holding device 25 as well as a holding bracket 26. Such will be described more fully with reference to FIG. 6.

It should be recognized that the number of pairs of support brackets 5 and holders 11 need not correspond to that illustrated in FIG. 1, but the number of such brackets and holders will depend on the length of the weaving loom shaft. The same applies for the number of pairs of holding devices 25 and holding brackets 26.

FIG. 3 is a detail view of holder 11 which is affixed, for example, using screws 17 at support rod 1 for the weaving loom shaft illustrated here only in part. Furthermore, it can be seen that key element 15 has a handle at one end defined by an aperture 18. Assuming a plurality of parallel, closely spaced apart weaving loom shafts each having removable attachments for the heddle support bars according to the invention, with each key element retracted to the position shown in FIG. 3, the operator can simply extend the tool, such as screwdriver, through aperture 18 of the respective key elements of the weaving loom shafts for simultaneously extending the key elements through aligned openings 9, 14 and 16 of the brackets and holders of the parallel weaving loom shafts. Correspondingly, the tool, when extended through the aligned apertures 18, can be utilized to release the attachments by retracting the key elements simultaneously.

In FIG. 4a a centering groove 13 is shown on the holder 11 for the reception of ridge 12 of support bracket 5. In FIG. 4b, two centering ridges 12' and 12" are shown received by two corresponding grooves 13' and 13" on support bracket 5. This double centering provides a higher cross-stability for the support bracket.

Although centering ridge 12 has been shown as provided on bracket 5 with the mating centering groove 13 as shown on holder 11, it can be appreciated that the centering ridge can otherwise be formed on the holder and the centering groove formed on the bracket, without departing from the invention.

In FIG. 5, bracket 5 and holder 11 are illustrated as interconnected by sliding key element 15, in a locked position for a weaving operation.

Another feature of the invention is the provision of holding device 25 on support rod 1 for the weaving loom shaft, and a holder bracket 26 affixed to heddle support bar 3 (FIGS. 1, 6). Bracket 26 is coupled to device 25 for holding the heddle support bar as well as the aligned heddles, temporarily prior to the interconnection of the holders 11 and brackets 5 utilizing key elements 15. Such is illustrated in FIG. 6 wherein bracket 26 is shown in dashed outline at a position corresponding to the position where heddle support bar 3 according to FIG. 5 is connected to support rod 1. In this instance, distance 28 between support rod 1 and heddle support bar 3 is smaller than distance 27. Thus, there is no contact between holding device 25 and holding bracket 26 during the weaving operation. The holding bracket 26 is, however, designed such that a free sliding of the heddles on heddle support bar 3 is permitted along the entire length in any position.

Thus, holding device 25 together with holding bracket 26 are designed for simple handling of the entire system and makes it possible for one operator to replace the warp change or style change efficiently and quickly. Nevertheless, the use of devices 25 and brackets 26 is not essential to the invention.

FIG. 7 shows an arrangement that is functionally the same as the one in FIG. 2, but with heddles 4' having J-shaped end eyelets and a correspondingly designed heddle support bar.

FIG. 8 shows an arrangement that is essentially the same as in FIG. 6, but uses heddles 4' with J-shaped end eyelets.

FIG. 9 is a perspective view, in expanded form, of a support bracket 5' and key element 15'. The end of the bracket has a groove 30 extending parallel to the key element, and the key element has a section of reduced cross-section, formed by cut outs 31, 31', located a spaced distance from end 32 of the key element opposite the end containing aperture 18. Support bracket 5' can therefore be mounted to its holder while front end 32 of key element 15' extends into opening 16 of holder 11. A connection on both ends of key element 15', which is reduced in height as shown by dashed outline 33, permits the same operational mode, wherein the insertion and removal of the support bracket 5' is even made easier, eventually due to the shorter distance of the assembly movement.

As shown in FIG. 10 wherein bracket 5' is interconnected with holder 11, interconnection is completed when key element 15' is slid sufficiently along its length such that cutouts 31, 31' are located beyond opening 9.

Parts 5, 11, 15, 25 and 26 may be of plastic material. However, the type of material from which they are made is irrelevant relative to the function of the parts according to the invention. Also, the key element can be of cross-sectional shapes other than that illustrated herein, and the centering ridge and mating groove may likewise be of shapes other than that illustrated, without departing from the invention. Depending on the selection of the material and the manufacturing process for the parts used, the form can be adjusted to manufacturing and material specific necessities, without departing from the invention. A mechanically sensible form for the centering groove 12 and centering ridge 13 is rectangular, such as shown in FIGS. 2 and 7. The sliderless heddle system shown is important to the function of the invention only in that a sliderless system must be used. Instead of heddles shown with C-shaped end eyelets, it also possible to use eyelets with the known J-shape.

Moreover, it is not important whether the dimensions for heddle end eyelets and heddle support bar cross-sections that are generally used today and are the international standard be retained or whether heddle end eyelets and heddle support bars of smaller dimensions be used, in order to save weight. For reasons of compatibility with the existing, internationally standardized systems for heddles and heddle support bars, corresponding designs and dimensions are preferred for the embodiment of the invention. For the actual function according to the invention, that is the simple replacement of heddle support bars together with the heddles in the plane of the weaving loom shaft and without the necessity of having to remove the weaving loom shaft from the weaving loom, however, the form and the dimensioning of heddles and heddle support bars is irrelevant. Any system that permits the free sliding of the heddles along the total length of the heddle support bars, if necessary also a newly developed system, can be used with the invention. The dimensions for the heddle end eyelets and the heddle support bars can be changed over wide ranges, just as the form can be changed, without influencing the functioning of the mounting of the heddle support bar 3 by means of support brackets 5 and holder 11 to support rod 1 of the weaving loom shaft.

What is claimed is:

1. A weaving loom shaft comprising support rods and side supports lying in a given plane, spaced apart heddle support bars lying in said plane substantially parallel to said support rods, means for removably mounting said support bars to said rods to facilitate replacement of the support bars in the loom shaft upon movement of each of the support bars solely toward the center of the weaving loom shaft substantially in said plane, said means comprising at least one pair of removably interconnected parts, one of the parts being non-removably affixed to at least one of the heddle support bars, and the other of the parts being non-removably affixed to at least one of said support rods, and said means further comprising a slidable telescopic connector in the form of a key element lying in said plane and parallel to said at least one of the heddle support bars and extending through aligned openings in said parts for removably interconnecting the parts together, whereby said at least one heddle support bar together with said one part non-removably affixed thereto is capable of being replaced in the loom shaft upon movement thereof in a direction solely toward said center of the shaft perpendicular to the support rods and substantially within said plane.

2. The weaving loom shaft according to claim 1, wherein the one part comprises a bracket and the other part comprises a holder receiving the bracket, said sliding means removably interengaging said bracket and said holder.

3. The weaving loom shaft according to claim 2, wherein the bracket has a body portion spaced in the direction of the plane from a confronting edge of the heddle support bar, and wherein the bracket has a leg depending from the body portion, said leg being spaced from a confronting side of the heddle support bar to permit heddles to slide freely past the bracket without interference.

4. The weaving loom shaft according to claim 3, wherein a first of the parts has a ridge and the second of the parts has a mating groove for positioning and stabilizing of the bracket and the holder to align the openings for the key element.

5. The weaving loom shaft according to claim 1, wherein first of the parts has a ridge and a second of the parts has a groove which mates with said ridge for positioning and stabilizing the parts when interconnected, to align the openings for the key element.

6. The weaving loom shaft according to claim 1, wherein said one part has one of said openings, and said other part has a pair of said openings spaced apart on opposite ends of said one opening.

7. The weaving loom shaft according to claim 1, wherein said key element has a handle for removably extending the key element through the aligned openings, said handle having an aperture extending perpendicular to said plane.

8. The weaving loom shaft according to claim 1, further comprising at least one holding element affixed to the heddle support bar, and at least one inset element affixed to one of the support short rods, said holding element engaging said inset element only for temporarily supporting the heddle support bar while being attached to the weaving loom shaft by the interconnection of the one part and the other part, said holding element disengaging said inset element when said parts are interconnected.

9. The weaving loom shaft according to claim 1, wherein the key element has a section of reduced cross-section located a spaced distance from opposite ends of the key element, the one part having a groove at one end extending parallel to the key element and corresponding to the reduced cross-section to permit an opening at said one end to be aligned with the key element while the key element engages the openings in the other part.

* * * * *